(12) United States Patent
Faust et al.

(10) Patent No.: US 6,247,751 B1
(45) Date of Patent: Jun. 19, 2001

(54) SEAT, ESPECIALLY A VEHICLE SEAT

(75) Inventors: Eberhard Faust, Stuttgart; Josef Klink, Nagold; Karl Pfahler, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/232,184

(22) Filed: Jan. 15, 1999

(30) Foreign Application Priority Data

Jan. 15, 1998 (DE) .............................................. 198 01 172

(51) Int. Cl.⁷ ...................................................... A47C 7/18
(52) U.S. Cl. ................... 297/180.13; 297/452.27; 297/452.42
(58) Field of Search ................... 297/180.11, 180.13, 297/180.14, 452.22, 452.27, 452.52, 452.56, 452.42

(56) References Cited

U.S. PATENT DOCUMENTS

| | | | |
|---|---|---|---|
| 3,137,523 | * 6/1964 | Karner | 297/180.13 |
| 3,614,159 | * 10/1971 | Christin | 297/452.27 |
| 4,259,896 | 4/1981 | Hayashi et al. . | |
| 4,685,727 | 8/1987 | Cremer et al. . | |
| 5,543,213 | 8/1996 | Duvenkamp . | |
| 5,544,942 | 8/1996 | Vu Khac et al. | 297/452.27 X |
| 5,597,200 | * 1/1997 | Gregory et al. | 297/180.13 |
| 5,902,014 | * 5/1999 | Dinkel et al. | 297/180.13 |
| 5,924,766 | * 7/1999 | Esaki et al. | 297/180.13 |

FOREIGN PATENT DOCUMENTS

| | | |
|---|---|---|
| 27 04 666 | 8/1978 | (DE) . |
| 39 03 303 | 8/1990 | (DE) . |
| 93 06 999 U | 7/1993 | (DE) . |
| 36 09 095 | 10/1996 | (DE) . |
| 280213 * | 8/1988 | (EP) .............................. 297/180.13 |
| 0 386 890 | 9/1990 | (EP) . |
| 633 161 | 1/1995 | (EP) . |

OTHER PUBLICATIONS

Von Dr. Hans–Albrecht Freitag, Fahrzeugsitze aus Chemiewerkstoffen, pp. 23–26.

French Search Report for corresponding application, May 12, 1999, with partial English language translation.

\* cited by examiner

*Primary Examiner*—Peter R. Brown
(74) *Attorney, Agent, or Firm*—Evenson, McKeown, Edwards & Lenahan, P.L.L.C.

(57) ABSTRACT

The invention relates to a seat, particularly a vehicle seat, having a cushion support and a cushion which is supported on the cushion support. The cushion has a seat surface and an edge area surrounding this surface and is composed of a cubical cushion body which encompasses the seat surface and of a foamed-to-shape edge part which rests on the lateral surfaces of the cushion body and fills the edge area. This provides optimal seat pressure distribution and the air-conditioned sitting comfort, while reducing the required proportion of manual work. The cushion support, which accommodates the cushion body as well as the edge part, is constructed in an air-permeable manner and the other hand, the cushion body consists of an air-permeable nonwoven material, while the edge part is manufactured of polyurethane foam or another material having the same characteristics, and is connected with cushion body.

36 Claims, 3 Drawing Sheets

SEAT, ESPECIALLY A VEHICLE SEAT

BACKGROUND AND SUMMARY OF THE INVENTION

This application claims the priority of German Patent Application No. 198 01 172.5–14, filed Jan. 15, 1998, the disclosure of which is expressly incorporated by reference herein.

The invention relates to a seat, particularly a vehicle seat having an air-permeable, cubical cushion.

In the case of a known vehicle seat as described in German Patent Document DE 27 04 666 A1, the edge part of the seat is formed of a frame produced from an integral foam in which a cut textile is foamed in close to its upper edge on the edge side which covers the surface. Below the cut textile, the frame is filled with a foamed-material body made of polyurethane (PUR). The foamed-material body is supported on a wall by means of its bottom side facing away from the cut textile. The frame is fastened on a surrounding outer profile of the wall. In the case of forward control vehicles, the wall may be constructed as a tin tub directly machined out of the vehicle body floor. Such a vehicle seat can be simply manufactured in a low-cost manner without a seat cover. However, this type of vehicle seat does not provide sufficient seating comfort since the integral foam of the frame has no significant cushioning elasticity and exercises a lateral pressure on the sitting person which is unpleasant.

In the case of a vehicle seat as described in European Patent Document EP 0 386 890 A1, the cushioning is composed of a load-absorbing seat cushion and a load-absorbing back cushion, on which two side cushions are fastened on the left and on the right respectively. The lateral parts are shaped with edge beads and are made of a foamed material which has a larger density than the foamed material of the seat cushion and the back cushion. This higher density foamed material of the lateral parts ensures a higher lateral stability with a simultaneous flexibility in the case of rotating movements of the person sitting in the vehicle seat.

In the case of a known vehicle seat of the initially mentioned type, in U.S. Patent Document U.S. Pat. No. 4,259,896, the inner cushioning body consists of an air-permeable material. The edge part which surrounds the cushioning body consists of a non-permeable material that is covered by a cushion covering made of an air-permeable material. A box is arranged on the underside of the air-permeable cushion support, which is constructed as a flat bucket. The box is constructed such that air flowing into it is deflected toward the cushion body and thus ventilates the air-permeable cushion body through the cushion support.

In the case of a cushion support for a vehicle seat as shown in German Patent Document DE 93 06 999 U1, it is known to construct the cushion body of different layers, which includes a layer made of an air-permeable nonwoven material.

In the case of these known seat cushion for vehicle seats, the seat cushion is composed of two different foam qualities. In this case, a soft center part is adjoined on the left and the right by two cheeks made of a harder foamed material and are glued to the center part (Freitag "Vehicle Seat made of Chemical Materials", Kunststoffberater 1982, Page 23–26).

Finally, as illustrated in German Patent Document DE 36 09 095 A1, it is known to construct a duct between the backrest cushion and the backrest rear wall to provide an air flow, thereby increasing the sitting comfort in the case of vehicle seats. As the result of a suitable, air-permeable construction of the backrest cushion, air flowing through the duct removes water vapor forming on the cushion surface when the seat is occupied.

The present invention is based on the object of providing a seat of the aforementioned type which provides optimum seat pressure distribution as well as air-conditioned sitting comfort. Simultaneously a reduction of the proportion of manual work required for high-quality seats is achievable during the manufacturing of the seat.

The seat according to the invention has the advantage that, as the result of the selected cushion materials, in the occupied condition of the seat, the cushion contours, interacting with the cushion elasticity, are optimally adapted to the body shape of the respective seat user. The division of the cubical cushion body having a very simple geometrical shape and the foamed-to-shape edge part having complicated shapes of the edge beads, results in a reduction in manual work expenditures on the cushion body made of a nonwoven material, thereby achieving a considerable lower cost for the manufacturing the seat. The air-permeable construction of the cushion support, in conjunction with the nonwoven material, permits good ventilation of the seat by means of existing air so that the air conditioning of the seat is also found to be very comfortable.

The cushion designed according to the invention is preferably used as a seat cushion and a backrest cushion which will then rest on an air-permeable cushion support fastened on the seat frame, on the one hand, and on the backrest frame, on the other hand.

Advantageous embodiments of the seat according to the invention with expedient further developments of the invention are contained in the additional claims.

According to a preferred embodiment of the invention, the fibers of the air-permeable nonwoven material extend perpendicularly to the top side of the cushion body. This significantly increases air permeability of the cushion body.

Latexed plant fibers, such as coconut fibers, latexed animal hair or mechanically or chemically/thermally connected textile fibers, such as wool, are preferably used as the nonwoven material. The cushion body may consist of several different layers of the above-mentioned nonwoven materials which are situated above one another and between which spacing knits may also be arranged.

In order to achieve a particularly pronounced surface softness, according to another embodiment of the invention, a thin layer of an open-pored and/or perforated cut foam is placed on the top side of the cushion body.

According to an advantageous embodiment of the invention, in the case of a vehicle seat with a seat cushion and a backrest, the cushion designed according to the invention is arranged in the seat cushion area as well as in the backrest area. A hollow space, which adjoins the cushion support and extends over the backrest is provided in the backrest. The hollow space has one opening respectively on or close to the bottom or top side of the backrest. On the bottom side of the backrest, at least one air guiding element is arranged. The air guiding element is constructed such that air from an air conditioning or heating system of the vehicle flowing along under the seat cushion is introduced at least partially into the hollow space. As the result of the air flow along the cushion support of the seat cushion and through the hollow space along the cushion support of the backrest and exiting on the top side of the backrest, good physiological air conditioning characteristics of the cushion construction according to the invention can be exhibited.

According to another embodiment of the invention, a ventilator may be provided for promoting the air movement. The ventilator may be arranged either under the seat cushion or on the underside of the backrest close to the opening of the hollow space.

Other objects, advantages and novel features of the present invention will become apparent from the following detailed description of the invention when considered in conjunction with the accompanying drawings.

BRIEF DESCRIPTION OF THE DRAWINGS

In the following, the invention will be described in detail by means of an embodiment illustrated in the drawing.

DETAILED DESCRIPTION OF THE DRAWINGS

Figure 4:
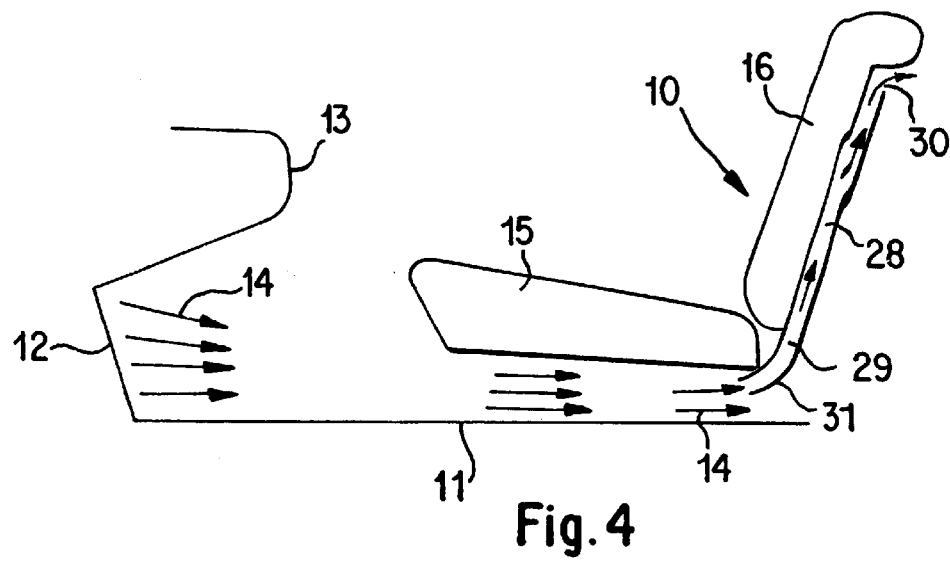
FIG. 4 is a schematic lateral view of a vehicle seat arranged in a vehicle body.

A schematic lateral view of the positioning of a vehicle seat is illustrated in FIG. 4. The vehicle seat 10 is fastened on the vehicle floor 11. Reference number 12 indicates a front wall of a vehicle body which separates the vehicle interior or the passenger compartment from the engine compartment. Reference number 13 indicates the instrument panel in the vehicle interior. Air inlet nozzles, which are not shown here, are situated in the leg space, through which air-conditioned air of a heating or air conditioning system flows into the occupant compartment. The inflowing air is symbolized by arrows 14.

Figure 1:
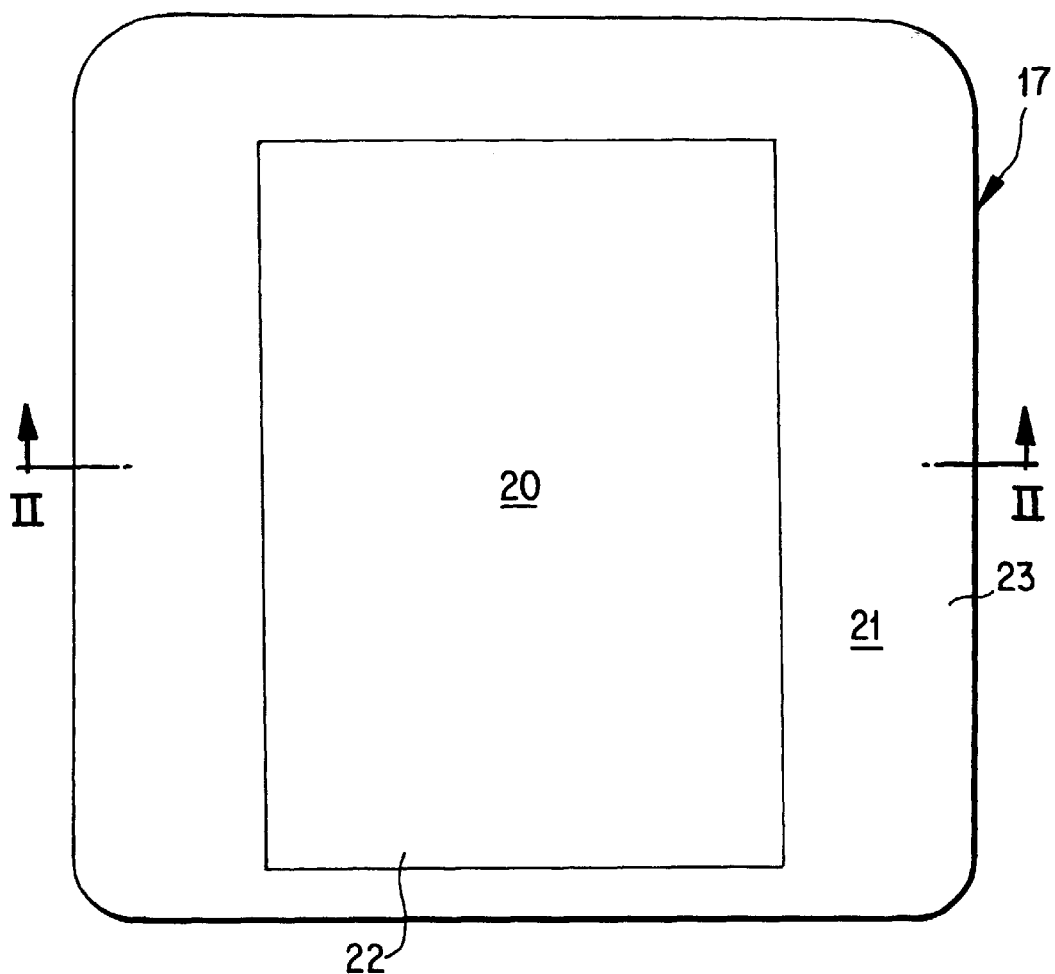
FIG. 1 is a schematic top view of a cushion for a vehicle seat.
Figure 2:
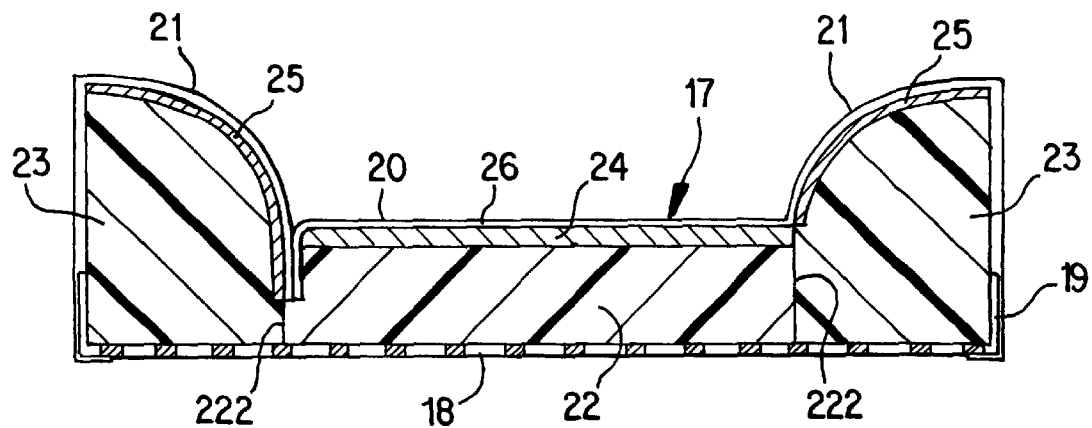
FIG. 2 is a schematic sectional view according to Line II—II in FIG. 1.

The vehicle seat 10 has a seat cushion 15 and a backrest 16. Both are covered by a cushion 17, which is illustrated in FIG. 1 as a top view and in FIG. 2 as a sectional view. Each cushion 17 is accommodated by an air-permeable cushion support 18, which in the embodiment of FIG. 2 is constructed as a leaf spring system which is fastened on a frame 19. In the area of the seat cushion 15, the frame 19 is represented by the seat cushion frame and, in the area of the backrest 16, it is represented by the backrest frame. Instead of a leaf spring system, a resilient woven structure can also be used which is fastened on the frame 19 in the same manner. In an alternative embodiment, the cushion support 18 consists of a highly perforated or slotted bucket in which the seat cushion area as well as the backrest area is constructed.

The cushion 17 has a surface 20 and an edge area 21 surrounding the surface 20. Cushion 17 is composed of a cushion body 22 encompassing the surface 20 having a simple cubical shape, and a foamed-to-shape edge part 23 encompassing the edge area 21. Edge part 23 forms the geometrically complicated shape of the lateral edge beads of edge area 21. The edge part 23 is attached to the surrounding lateral surface 222 of the cushion body 22 and is at least partially connected with it by gluing or by a foaming-on process. FIG. 2 shows two alternatives of the joining of the edge part 23 to the cushion body 22. On the right in FIG. 2, a full-surface connection of each lateral surface 222 takes place with the edge part 23. On the left in FIG. 2, only a portion of each lateral surface 222 is fixedly connected with the edge part 23.

Figure 2A:
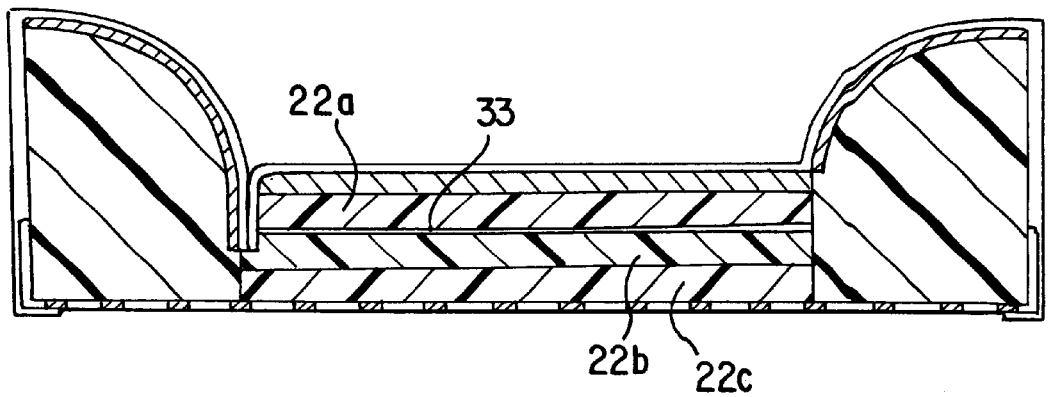
FIG. 2a is the same schematic representation as in FIG. 2 showing the cushion body being composed of several different individual layers.

The cushion body 22 consists of an air-permeable nonwoven material of a simple design, preferably a rectangular shape of a uniform thickness and can therefore be produced expediently without a large amount of manual work. The fibers of the nonwoven material preferably extend at a right angle with respect to the surface of the cushion body 22 forming the seat surface 20. Latexed plant fibers, such as coconut fibers, latexed animal hair or mechanically and/or chemically/thermally connected textile fibers, such as wool, are used as the fiber material. The cushion body 22 can be constructed in one piece, as illustrated in FIG. 2 or may be composed of several different layers 22a, 22b, 22c, etc. of the above-mentioned nonwoven material which are situated above one another, as illustrated in FIG. 2a, a spacing knit 33 also being insertable between the individual layers. For achieving a pronounced surface softness, a relatively thin layer 24 of an open-pored and/or perforated cut foam may be placed on the cushion body 22.

The edge part 23, which encompasses the geometrically complicated edge area 21 of the cushion 17, has edge beads and rounded outer edges. Edge part 23 is comprised of polyurethane foam or of an alternative material of the same characteristic, such as a thermobond nonwoven material. The surface of the edge part 23, which is adjacent to the seat surface 20, is provided with a moisture-absorbing and moisture-conducting covering 25. Covering 25 consists of, for example, a wool nonwoven or rubberized-hair nonwoven material, optionally in combination with a spacing knit. As a whole, the cushion 17 is covered by means of a cushion covering 26 which covers the seat surface 20 and the edge area 21 and extends laterally over the edge part 23 to the cushion support 18. The cushion covering 26 consists of an air-permeable textile fabric with a back-side lamination made of an air-permeable cut foam or nonwoven material. When there is only partial connection between the lateral surfaces 222 of the cushion body 22 and of the edge part 23, such as illustrated on the left side of FIG. 1, the cushion covering 26 is pulled over the free part of the lateral surfaces 222.

Figure 3:
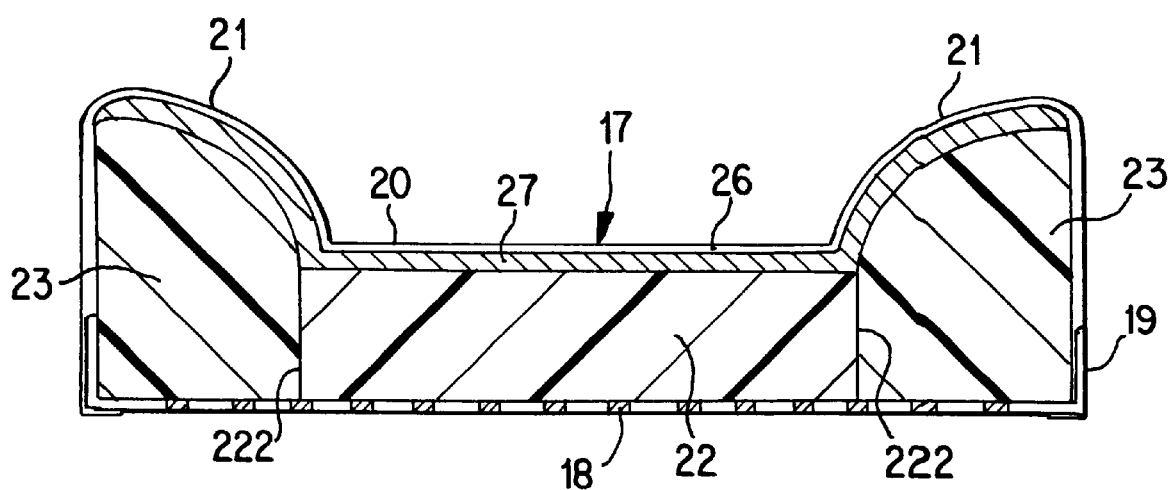
FIG. 3 is the same schematic representation as in FIG. 2 of a modified cushioning.

Another embodiment of cushion 17, which is illustrated as a cross-sectional view in FIG. 3, is constructed generally in the same manner as the cushion 17 according to FIG. 2. Instead of the layer 24 on the cushion body 22 and the covering 25 on the edge part 23, the whole cushion surface on the seat surface 20 and in the edge area 21 is covered by a continuous buffer layer 27 of a constant thickness made of a moisture-absorbing and moisture-conducting material. The buffer layer 27 may consist of a wool nonwoven or similar material. As an alternative or in addition, a spacing knit can also be used.

Figure 5:
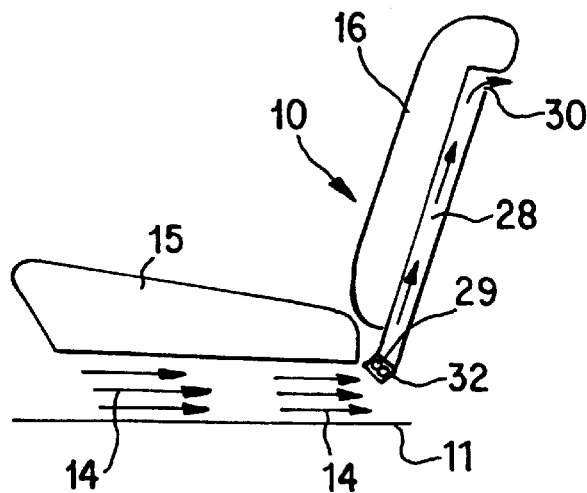
FIGS. 5 and 6 are the same schematic representations as in FIG. 4 of a vehicle seat according to two additional embodiments.
Figure 6:
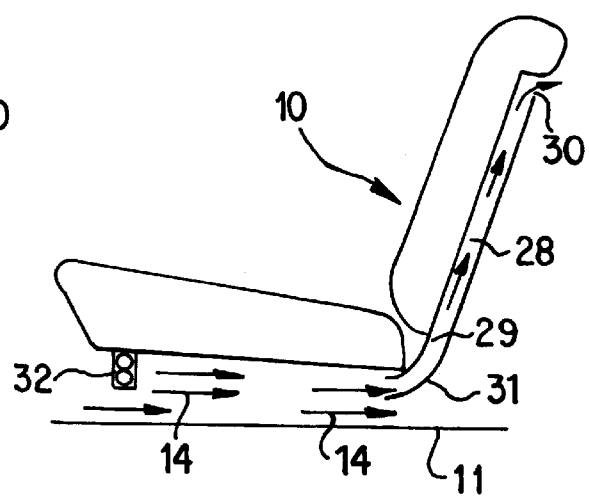

In order to fully exhibit good physiological air-conditioning characteristics of the above-described cushion 17, additional features are provided, as illustrated in FIGS. 4 to 6, for generating air movement along the backside of the cushions. In the embodiment of FIG. 4, the air flow 14 of the vehicle ventilation system, such as the heating or air-conditioning system, is guided in the leg space area under the vehicle seat so that it brushes over the backside of the cushion support 18 in the area of the seat cushion 15. On the backside of the backrest 16, a hollow space 28 is provided which directly adjoins the cushion support 17 and extends over the backrest 16.

Hollow space 28 is bounded on one longitudinal side by the cushion support 18 and has one opening 29 and 30 on or close to the underside and top side of the backrest 16 respectively. In addition, at least one air guiding element 31 is constructed on the underside of the backrest 16 such that the air flowing under the seat cushion 15 is introduced at least partially into the hollow space 28. In the embodiment of FIG. 4, the air guiding element 31 is constructed as a bent shaft joined to the opening 29 and which extends under the underside of the seat cushion 15 and thereby projects the air flow 14.

In order to intensify the air movement on the backside of the cushion 17, ventilators 32 may additionally be provided, as illustrated in FIGS. 5 and 6. In this case, a ventilator 32 may be arranged on the underside of the seat cushion 15 (FIG. 6) or on the underside of the backrest 16 in the proximity of the opening 29 of the hollow space 28 (FIG. 5).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat comprising, a cushion having a seat surface and an edge area surrounding the seat surface, the cushion further including an air-permeable cushion body and an edge part adjacent lateral surfaces of the cushion body thereby defining the edge area, and an air-permeable cushion support structure which is separate from, is abuttingly directly engaged with, and which supports the cushion body and the edge part such that the edge part is engaged with an air-permeable portion at the cushion support structure, wherein the cushion body includes an air-permeable nonwoven material, and the edge part includes a foam-type material that is foamed to shape and is fixedly connected with the cushion body.

2. A vehicle seat according to claim 1, wherein the air-permeable nonwoven material comprises fibers that are aligned at a right angle with respect to the surface of the cushion body facing the seat surface.

3. A vehicle seat according to claim 2, wherein the fibers are latexed plant fibers, such as coconut fibers, latexed animal hair or mechanically or chemically/thermally connected textile fibers, such as wool.

4. A vehicle seat according to claim 3, wherein the cushion body comprises several layers of different nonwoven materials that are situated on top of one another.

5. A vehicle seat according to claim 4, wherein a spacing knit is arranged between at least two layers.

6. A vehicle seat according to claim 5, wherein a thin layer comprising an open-pored or perforated cut foam is positioned on a surface of the cushion body adjacent the seat surface.

7. A vehicle seat according to claim 5, wherein the edge part is provided on a top side adjacent to the seat surface with a moisture-absorbing and moisture-conducting covering, comprising of a wool nonwoven material or a rubberized hair nonwoven material.

8. A vehicle seat according to claim 5, wherein a top side of the cushion is covered by a continuous buffer layer of a substantially constant thickness made of a moisture-absorbing and moisture-conducting material, comprising a wool nonwoven or rubberized hair nonwoven material.

9. A vehicle seat according to claim 5, wherein the cushion is covered by an air-permeable textile fabric.

10. A vehicle seat according to claim 4, wherein a thin layer comprising an open-pored or perforated cut foam is positioned on a surface of the cushion body adjacent the seat surface.

11. A vehicle seat according to claim 4, wherein the edge part is provided on a top side adjacent to the seat surface with a moisture-absorbing and moisture-conducting covering, comprising of a wool nonwoven material or a rubberized hair nonwoven material.

12. A vehicle seat according to claim 4, wherein a top side of the cushion is covered by a continuous buffer layer of a substantially constant thickness made of a moisture-absorbing and moisture-conducting material, comprising a wool nonwoven or rubberized hair nonwoven material.

13. A vehicle seat according to claim 4, wherein the cushion is covered by an air-permeable textile fabric.

14. A vehicle seat according to claim 3, wherein a thin layer comprising an open-pored or perforated cut foam is positioned on a surface of the cushion body adjacent the seat surface.

15. A vehicle seat according to claim 3, wherein the edge part is provided on a top side adjacent to the seat surface with a moisture-absorbing and moisture-conducting covering, comprising of a wool nonwoven material or a rubberized hair nonwoven material.

16. A vehicle seat according to claim 3, wherein a top side of the cushion is covered by a continuous buffer layer of a substantially constant thickness made of a moisture-absorbing and moisture-conducting material, comprising a wool nonwoven or rubberized hair nonwoven material.

17. A vehicle seat according to claim 3, wherein the cushion is covered by an air-permeable textile fabric.

18. A vehicle seat according to claim 2, wherein a thin layer comprising an open-pored or perforated cut foam is positioned on a surface of the cushion body adjacent the seat surface.

19. A vehicle seat according to claim, 2, wherein the edge part is provided on a top side adjacent to the seat surface with a moisture-absorbing and moisture-conducting covering, comprising of a wool nonwoven material or a rubberized hair nonwoven material.

20. A vehicle seat according to claim 2, wherein a top side of the cushion is cove red by a continuous buffer layer of a substantially constant thickness made of a moisture-absorbing and moisture-conducting material, comprising a wool nonwoven or rubberized hair nonwoven material.

21. A vehicle seat according to claim 2, wherein a top side of the cushion is covered by a continuous buffer layer of a substantially constant thickness made of a moisture-absorbing and moisture-conducting material, comprising a wool nonwoven or rubberized hair nonwoven material.

22. A vehicle seat according to claim 1, wherein a thin layer comprising an open-pored or perforated cut foam is positioned on a surface of the cushion body adjacent the seat surface.

23. A vehicle seat according to claim 22, wherein the edge part is provided on a top side adjacent to the seat surface with a moisture-absorbing and moisture-conducting covering, comprising of a wool nonwoven material or a rubberized hair nonwoven material.

24. A vehicle seat according to claim 22, wherein the cushion is covered by an air-permeable textile fabric.

25. A vehicle seat according to one of claim 1, wherein the edge part is provided on a top side adjacent to the seat surface with a moisture-absorbing and moisture-conducting covering, comprising a wool nonwoven material or a rubberized hair nonwoven material.

26. A vehicle seat according to claim 25, wherein the cushion is covered by an air-permeable textile fabric.

27. A vehicle seat according to claim 1, wherein a top side of the cushion is covered by a continuous buffer layer of a substantially constant thickness made of a moisture-absorbing and moisture-conducting material, comprising a wool nonwoven or rubberized hair nonwoven material.

28. A vehicle seat according to claim 27, wherein the cushion is covered by an air-permeable textile fabric.

29. A vehicle seat according to claim 1, wherein the edge part is fastened to the lateral surfaces of the cushion body by means of a bonding agent.

30. A vehicle seat according to claim 1, wherein the edge part is foam connected to the cushion body.

31. A vehicle seat according to one of claim 1, wherein the cushion is covered by an air-permeable textile fabric.

32. A vehicle seat according to claim 31, wherein the textile fabric has a back-side lamination made of an air-permeable cut foam or nonwoven material.

33. A vehicle seat according to claim 32, wherein the cushion comprises, a seat cushion and a backrest, further wherein the cushion is arranged with an air-permeable cushion support in the seat cushion and in the backrest, and further comprises a hollow space adjoining the cushion support and extending behind the backrest, the hollow space having an opening, on or close to the lower edge and upper edge of the backrest, respectively and an air guiding element positioned on an underside of the backrest such that air of a vehicle ventilation system flowing under the seat cushion is at least partially introduced into the hollow space.

34. A vehicle seat according to claim 33, further comprising a ventilator to intensify the air flow arranged under the seat cushion, or on or close to the hollow space opening on the underside of the backrest.

35. A vehicle seat cushion comprising:

an air-permeable cushion body having lateral edges, the cushion body being made of an air-permeable, nonwoven material;

a geometrically shaped edge area adapted to surround and be fixedly connected to the lateral edges of the cushion body, the edge area further including an edge part being made of a foam material; and an air-permeable cushion support structure positioned below the cushion body to support the cushion body and the edge area such that the edge part is engaged with an air-permeable portion at the cushion support structure, the cushion support structure being separate from and abuttingly directly engaged with, the cushion body and the edge part.

36. A vehicle seat cushion comprising:

an air-permeable cushion body having lateral edges, the cushion body being made of an air-permeable, nonwoven material containing fibers;

a geometrically shaped edge part of foam material shaped to surround and be fixedly connected to the lateral edges of the cushion body; and an air-permeable cushion support structure positioned below the cushion body to support the cushion body and the edge area, the cushion support structure being separate from and abuttingly directly engaged with the cushion body and the edge part such that the edge part is engaged with an air-permeable portion of the cushion support structure.

* * * * *